(12) United States Patent
Arai et al.

(10) Patent No.: US 7,386,386 B2
(45) Date of Patent: Jun. 10, 2008

(54) DRIVING CONTROL APPARATUS

(75) Inventors: Toshiaki Arai, Utsunomiya (JP);
Tadayoshi Okada, Shioya-gun (JP);
Hisaya Izawa, Utsunomiya (JP);
Makoto Matsumoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 451 days.

(21) Appl. No.: 11/264,964

(22) Filed: Nov. 1, 2005

(65) Prior Publication Data

US 2006/0095194 A1 May 4, 2006

(30) Foreign Application Priority Data

Nov. 4, 2004 (JP) ............................ P2004-320401
Oct. 13, 2005 (JP) ............................ P2005-298563

(51) Int. Cl.
*B60T 7/12* (2006.01)
(52) U.S. Cl. .................. 701/96; 701/301; 701/205; 340/435; 340/436; 340/903; 342/455
(58) Field of Classification Search .............. 701/23, 701/28, 1, 93, 96, 205, 301; 340/435, 436, 340/903; 342/70, 455; 180/170, 179
See application file for complete search history.

(56) References Cited

U.S. PATENT DOCUMENTS 5,806,019 A * 9/1998 Ishiyama .................... 701/300

6,684,149 B2 * 1/2004 Nakamura et al. ............ 701/96

FOREIGN PATENT DOCUMENTS

| JP | 06-171482 | 6/1994 |
| JP | 3194305 | 6/1994 |

* cited by examiner

*Primary Examiner*—Gertrude Arthur Jeangla
(74) *Attorney, Agent, or Firm*—O'Melveny & Myers LLP

(57) ABSTRACT

A driving control apparatus comprising: an detecting device that detects objects; a preceding vehicle determining device that determines a preceding vehicle; a driving control device that executes a driving control; a control start intention detection device that detects an intention of a driver to start the control; and a control start intention detection device that detects an intention of a driver to start the follow-up control or the stop hold control, wherein the control state determination device sets to the follow-up control state when the preceding vehicle is detected by the preceding vehicle detection device and when the intention is detected, and sets to the stop hold state when the intention is detected while the vehicle is substantially in the stopped and no object is detected by the object detection device.

3 Claims, 5 Drawing Sheets

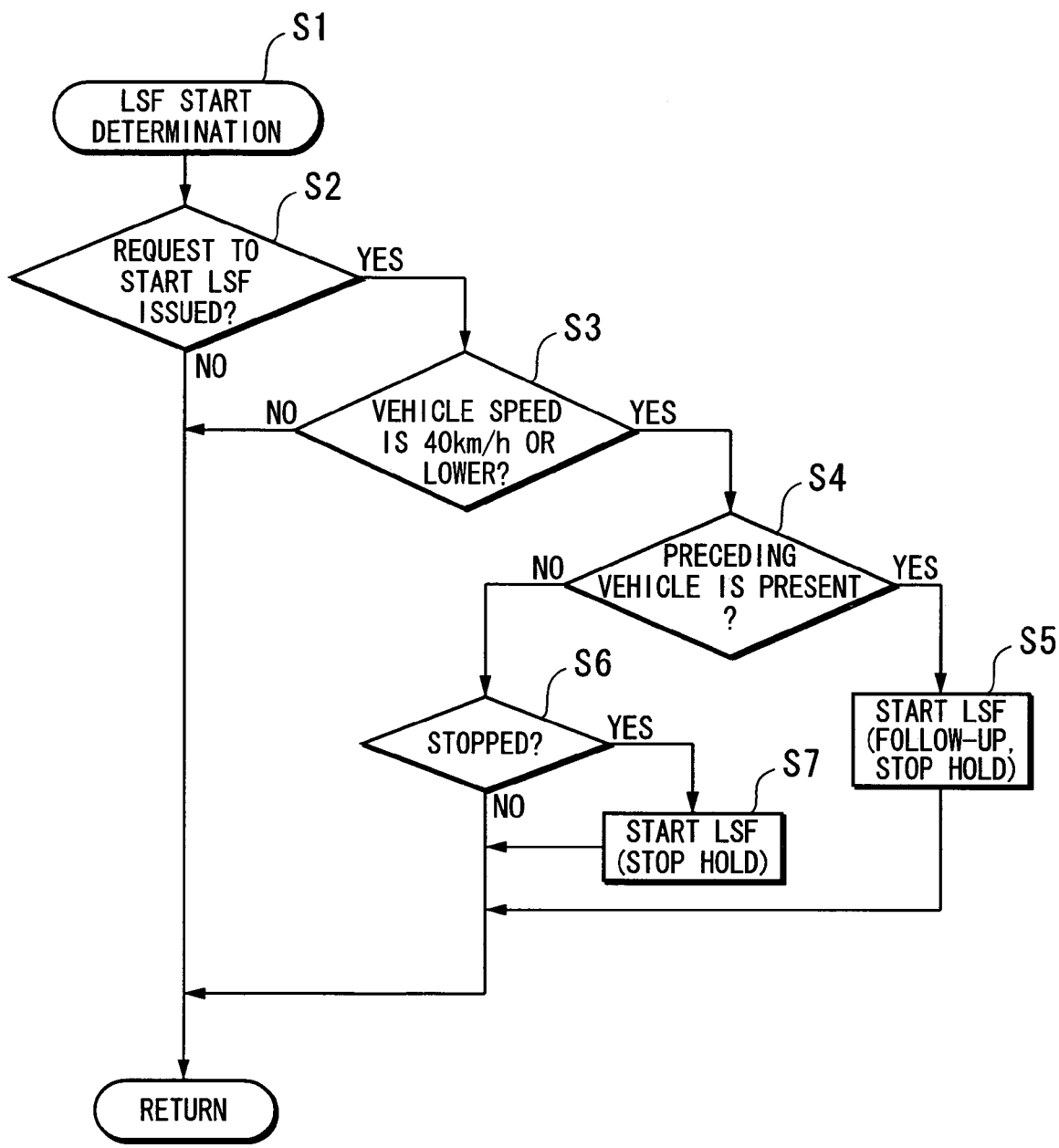

DRIVING CONTROL APPARATUS

BACKGROUND OF THE INVENTION

1. Field of the Invention

The present invention relates to a driving control apparatus that executes driving control of a vehicle by selecting a vehicle that is traveling in front of the vehicle so that it can follow that vehicle. More specifically, the present invention relates to a driving control apparatus that executes a low speed following (LSF) in which the vehicle can be started or stopped following the preceding vehicle in a relatively low vehicle speed region.

Priority is claimed on Japanese Patent Application No. 2004-320401, filed Nov. 4, 2004 and Japanese Patent Application No. 2005-298563, filed Oct. 13, 2005, the contents of which is incorporated herein by reference.

2. Description of the Related Art

In recent years, various types of driving control apparatuses have been developed which are aimed at reducing the driver's work load in operating the vehicle.

One type of such apparatuses is a driving control apparatus that executes a low-speed follow-up control that controls a driving state of a vehicle such that a predetermined inter-vehicle distance is maintained between the vehicle and a preceding vehicle when the vehicle is traveling at a low speed (including when the vehicle is stopped).

For example, Japanese Patent No. 3194305 discloses a technique in which when a vehicle is stopped at the front at a red light at an intersection or at the front at a railroad crossing, if a brake pedal is depressed and the vehicle speed is zero, the stopped state is maintained by a brake operating device. With this technique, even when the inter-vehicle distance to the preceding vehicle is increased, the brake hold state is not canceled. The brake hold state is canceled when the inter-vehicle distance to the preceding vehicle is equal to or less than a predetermined value and when a relative speed with respect to the preceding vehicle is a positive value.

Millimeter-wave radar apparatuses are widely used as devices for detecting a preceding vehicle. However, these radar apparatuses may fail to detect an object which is at a shorter distance than the detectable distance since the time interval between the time when the radar transmits electromagnetic waves and the time when the waves reflected by the object are received is short. Therefore, even when a vehicle is preceding the vehicle, the LSF control is not executed since the preceding vehicle is not detected when the distance from the preceding vehicle is very short, or when a pedestrian passes between the vehicles, for example. As a result, the driver is required to operate the brake manually and continuously in order to maintain the vehicle in the stopped state, which is an inconvenience to the driver. In addition, the driver may feel discomfort since a follow-up control is cancelled even when the vehicle is preceding the vehicle.

Accordingly, the present invention is directed to provide a driving control apparatus that is capable of continuing an execution of an LSF control even when no preceding vehicle is detected in order to enhance the convenience without discomforting the driver.

SUMMARY OF THE INVENTION

A first aspect of the present invention is a driving control apparatus comprising: a vehicle speed sensor that detects a traveling speed of a vehicle; an object detecting device that is installed in the vehicle and is capable of detecting objects that are present in a direction in which the vehicle travels; a preceding vehicle determining device that determines a preceding vehicle which the vehicle is to follow among the detected objects; a target inter-vehicle distance determination device that determines a target inter-vehicle distance between the vehicle and the preceding vehicle; a target vehicle speed determining device that determines a target vehicle speed of the vehicle based on a signal from the object detecting device and the target inter-vehicle distance determined; a driving control device that executes a driving control on the vehicle based on the determined target vehicle speed; a control state determination device that sets the control state of the vehicle to one of a follow-up control state in which the vehicle is made to travel following at least the preceding vehicle and a stop hold state in which the vehicle is maintained in a stopped state; and a control start intention detection device that detects an intention of a driver to start the follow-up control or the stop hold control, wherein the control state determination device sets the control state of the vehicle to the follow-up control state when the preceding vehicle is detected by the preceding vehicle determining device and when the intention of the driver to start the follow-up control or the stop hold control is detected by the control start intention detection device, and sets the control state of the vehicle to the stop hold state when the intention of the driver to start the follow-up control or the stop hold control is detected by the control start intention detection device while the vehicle is substantially in the stopped and no object is detected by the object detection device.

In a second aspect of the present invention, the control start intention detection device may detect the intention of the driver to start the follow-up control or the stop hold control based on a signal from a switch provided in the vicinity of a steering wheel.

In a third aspect of the present invention, a time counting device that starts counting an elapsed time between when the intention of the driver to start the follow-up control or the stop hold control is detected and when the preceding vehicle is detected may be provided, and the control state determination device may change the control state of the vehicle from the stop hold state to the follow-up control state when the elapsed time that is counted by the time counting device is within a predetermined time period.

According to the first aspect of the present invention, even if no object is detected by the object detection device, the stop hold state is set by the control state determination device when the vehicle is substantially in the stopped state and when the intention of the driver to start the follow-up control or the stop hold control is detected by the control start intention detection device. As a result, the stop hold state is set even when no preceding vehicle is detected due to the detection limit of the object detection device. Accordingly, it is possible to maintain the vehicle in the stopped state even when the driver stops operating the brake pedal. Furthermore, the discomfort that the driver may feel when a follow-up control is cancelled even when the preceding vehicle is present in front of the vehicle is eliminated. Furthermore, the control state of the vehicle is set to the follow-up control state when the intention of the driver to start the follow-up control or the stop hold control is detected by the control start intention detection device after the preceding vehicle has started and the preceding vehicle can be detected by the object detection device. Thus, it is possible to smoothly switch a control mode to a control state in which the vehicle is made to follows the preceding vehicle thereby reducing the driver's load in carrying out driving operations. As described herein, the term "a vehicle is substantially stopped" means that the vehicle may be completely stopped, or the vehicle is traveling at a speed at which the vehicle can be regarded as being stopped (for example, at several kilometers per hour or less).

According to the second aspect of the present invention, since the control start intention detection device detects the intention of the driver to start the follow-up control or the stop hold control based on a signal from the switch provided in the vicinity of a steering wheel, the driver can make a control operation using the switch provided in the vicinity of the vehicle. Thus, improved usability allows the driver to carry out driving operations without giving any stress.

According to the third aspect of the present invention, it is possible to change the control state of the vehicle to the follow-up control state when the elapsed time that is counted by the time counting device is within a predetermined time period since the intention to start the follow-up control or the stop hold control has been detected. Thus, it is possible to start the follow-up control even in the above-described situation, thereby increasing the convenience.

BRIEF DESCRIPTION OF THE DRAWINGS

FIG. 5 is a flowchart showing an operation to determine whether to start an LSF of the follow-up driving control apparatus shown in FIG. 1.

DETAILED DESCRIPTION OF THE INVENTION

Hereinafter, a driving control apparatus according to an embodiment of the present invention will be described with reference to the drawings.

Configuration of Apparatus

Figure 1:
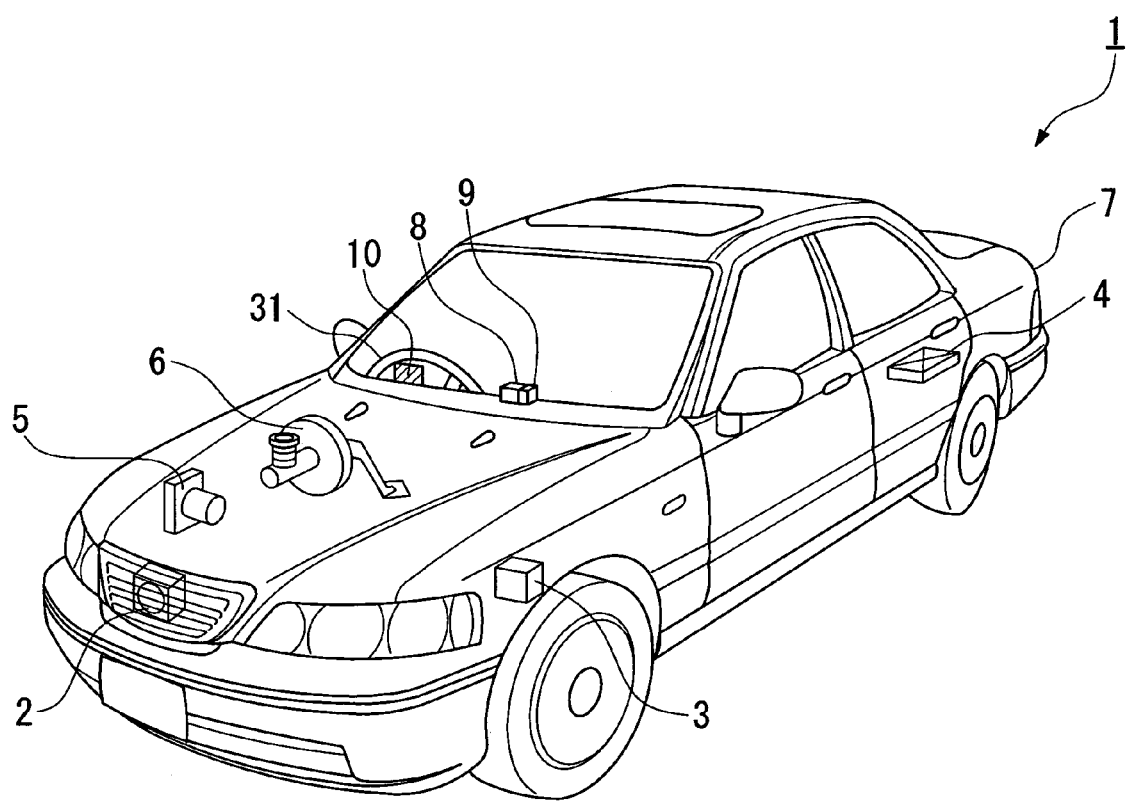
FIG. 1 is a perspective view of a vehicle that includes a follow-up driving control apparatus according to an embodiment of the present invention.
Figure 2:
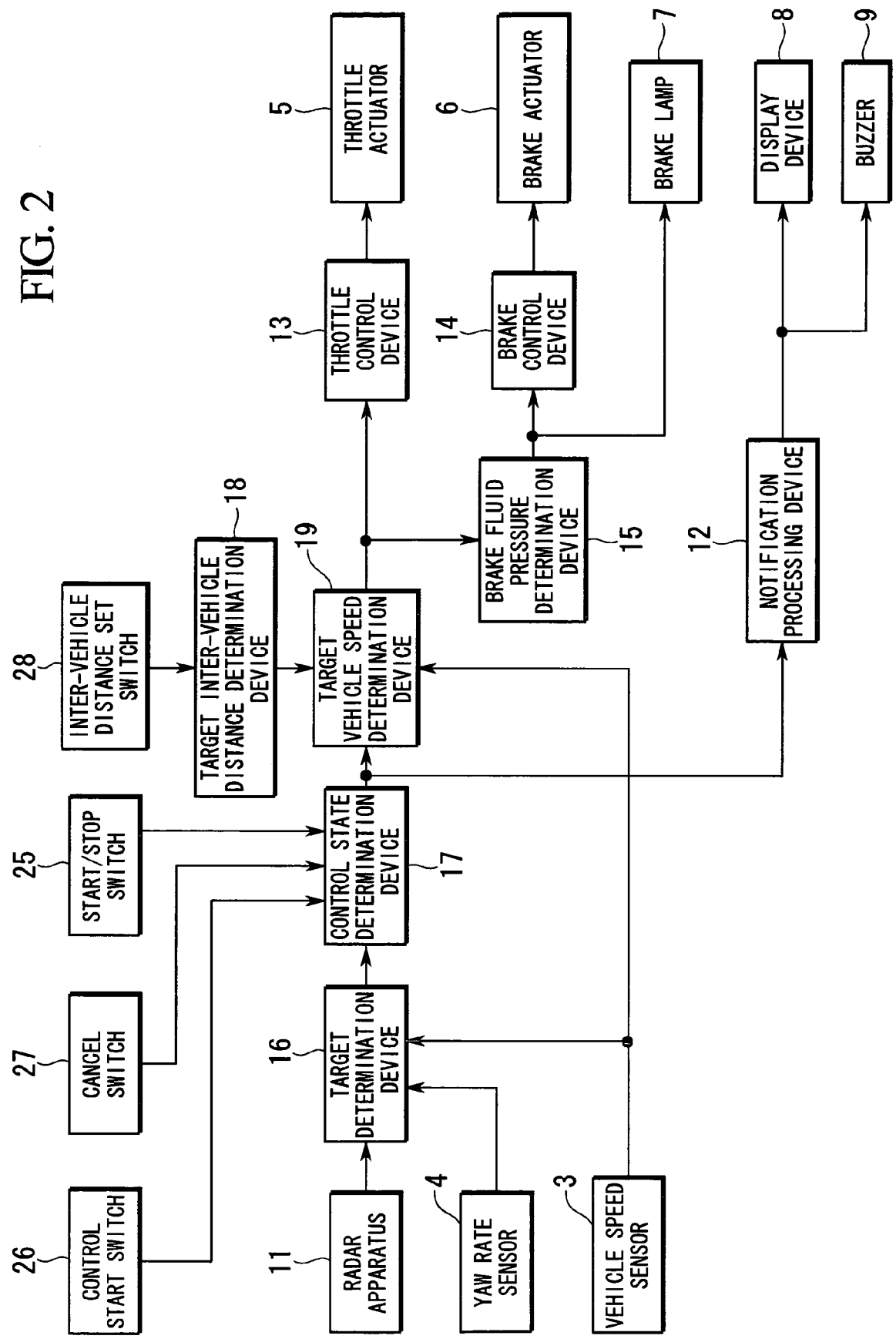
FIG. 2 is block diagram illustrating the configuration of the follow-up driving control apparatus shown in FIG. 1.

FIG. 1 is a perspective view of a vehicle 1 that includes a follow-up driving control apparatus according to an embodiment of the present invention, and FIG. 2 is block diagram showing the configuration of the follow-up driving control apparatus shown in FIG. 1.

The driving control apparatus according to the present embodiment is constructed as a millimeter wave radar integrated ECU (Electronic Control Unit) 2. The vehicle 1 includes a vehicle speed sensor 3 that detects the vehicle speed of the vehicle 1, and a yaw rate sensor 4 that detects the yaw rate of the vehicle 1. The detected vehicle speed and the yaw rate are sent to the millimeter wave radar integrated ECU2 (driving control apparatus).

Furthermore, a throttle actuator 5 that operates the throttle of an engine of the vehicle 1 by means of fluid pressure and electricity and a brake actuator 6 that similarly operates brakes of the vehicle 1 by fluid pressure and electricity are provided in the vehicle 1.

A brake lamp 7 that indicates the operating state of the brakes of the vehicle 1 is provided in the rear of the vehicle 1.

Furthermore, in the vicinity of the cockpit of the vehicle 1, a display device 8, and a buzzer 9 that notify the control status of the driving control apparatus to the driver are provided. In the vicinity of a steering wheel 31, switches 10 for receiving driving operations from the driver to be sent to the driving control apparatus are provided.

Here, the millimeter wave radar integrated ECU 2 (follow-up driving control apparatus) will be explained in detail with reference to FIG. 2. Reference numeral 11 denotes a radar apparatus of the millimeter wave radar integrated ECU 2, provided in the front of the vehicle 1. The radar apparatus 11 transmits a radar wave around the vehicle 1, and receives a reflected wave of the radar wave reflected by an object. The radar apparatus 11 uses the received reflected wave to detect objects that are present in front of the vehicle 1.

The follow-up driving control apparatus of the present embodiment also includes processing devices embodied in the ECU portion of the millimeter wave radar integrated ECU 2 having a CPU (central processing device). Such processing devices include a notification processing device 12, a throttle control device 13, a brake control device 14, a brake fluid pressure determination device 15, a target determination device 16, a control state determination device 17, a target inter-vehicle distance determination device 18, and a target vehicle speed determination device 19.

The notification processing device 12 is a processing device that notifies the control status of the follow-up driving control apparatus to the driver by means of the display device 8 and/or the buzzer 9 in the vicinity of the cockpit.

The throttle control device 13 is a processing device that controls the throttle actuator 5 that sets the degree of throttle opening (throttle position) for operating the throttle of the engine of the vehicle 1.

The brake control device 14 is a processing device that controls the brake actuator 6 for operating the brakes of the vehicle 1. The control by the brake control device 14 is executed based on the target fluid pressure (hydraulic pressure) of the brake fluid that is determined by the brake fluid pressure determination device 15. The turning on and off of the brake lamp 7 that is installed in the rear of the vehicle 1 is controlled based on the target fluid pressure of the brake fluid that is determined by the brake fluid pressure determination device 15, or the actual fluid pressure.

The target determination device 16 is a processing device that processes information on objects that are present ahead of the vehicle 1 which is detected by the radar apparatus 11. The target determination device 16 includes a driving route calculation device that calculates the driving route of the vehicle 1 based on the vehicle speed determined by the vehicle speed sensor 3 or the yaw rate determined by the yaw rate sensor 4. The target determination device 16 also includes a preceding vehicle determination processing device that detects a preceding vehicle that the vehicle 1 follows based on the calculated vehicle driving route and information, which is received from the radar apparatus 11, on the objects that are detected ahead of the vehicle 1, and calculates the object information on the detected preceding vehicle and the distance and the relative speed between the preceding vehicle and the vehicle 1.

Furthermore, also provided is a preceding vehicle start detection device that determines whether or not the preceding vehicle has been started from the stopped state based on the calculated object information in order to detect starting of the preceding vehicle.

For example, the preceding vehicle determination processing device determines the radius (R) of a corner of the road on which the vehicle 1 is traveling, and determines the route of the vehicle by dividing the traveling speed of the vehicle 1 by the yaw rate of the vehicle 1. The preceding vehicle determination processing device then recognizes a vehicle on an extension of the route of the vehicle as a preceding vehicle. The preceding vehicle determination processing device detects static objects, such as a reflector and a white line along the sides of a traffic lane, and distinguishes a preceding vehicle in the traffic lane along which the vehicle 1 is traveling from vehicles on adjacent traffic lanes. When the vehicle 1 stops, the preceding vehicle determination processing device distinguishes the preceding vehicle from other vehicles by utilizing the route of the vehicle until the vehicle stops.

The control state determination device 17 is a processing device that executes driving control based on a signal from switches 10 (including a start/stop switch 25 for receiving a request to start or stop the vehicle 1 from the driver, or a control start switch 26 for receiving a request to start the follow-up control, or a cancel switch 27 for receiving a request to cancel the follow-up control) that are configured to input driving operations from the driver, and the object information that it is received from the target determination device 16. The control state determination device 17 controls the driving control of the vehicle 1 by state transition among states A: OFF, B: FOLLOW-UP, and C: STOP HOLD and notifies a control state to the driver by means of the notification processing device 12. The state transition of the driving control of the vehicle 1 in the control state determination device 17 will be described in detail later.

The target inter-vehicle distance determination device 18 is a processing device that determines a target inter-vehicle distance between the vehicle 1 and the preceding vehicle based on operation of an inter-vehicle distance set switch 28, i.e., one of the switches 10 that are configured to receive driving operations from the driver, the target inter-vehicle distance being controlled by the follow-up driving control apparatus of the present embodiment. The target vehicle speed determination device 19 calculates an optimal traveling speed of the vehicle 1 based on the control state determined by the control state determination device 17 and the determined target inter-vehicle distance determined by the target inter-vehicle distance determination device 18, and controls the throttle control device 13 and the brake fluid pressure determination device 15 so that the vehicle 1 travels at this target vehicle speed.

More specifically, when the target vehicle speed is greater than the current traveling speed of the vehicle 1, the target vehicle speed determination device 19 instructs the throttle actuator 5 to increase the degree of the throttle opening that is output by the throttle control device 13 so that the number of revolutions of the engine is increased to accelerate the vehicle. In contrast, when the target vehicle speed is lower than the current traveling speed of the vehicle 1, the target vehicle speed determination device 19 instructs the brake actuator 6 to increase the target fluid pressure of the brake fluid that is output by the brake fluid pressure determination device 15 so that the brake control device 14 applies the brakes.

The vehicle 1 of this embodiment includes the following functions: low-speed follow-up, stop hold, preceding vehicle start notification, cancellation, preceding vehicle switching, stop hold continue, automatic cancellation, and alert functions. Descriptions of each of the functions are listed in Table 1.

TABLE 1

| No. | Function | Description |
| --- | --- | --- |
| 1 | Low-Speed Follow-Up | Drive the vehicle following the preceding vehicle when the CONTROL START SW is depressed at the vehicle speed region of 40 km/h or lower |
| 2 | Stop Hold | Stop the vehicle in response to the preceding vehicle's stopping; maintain the stopped state afterward |
| 3 | Preceding Vehicle Start Notification | Notify a start of preceding vehicle by means of visual and audio indications |
| 4 | Cancellation | A brake operation is cancelled when the START SW is depressed or the accelerator pedal is depressed, and following is restarted |
| 5 | Preceding Vehicle Switching | Follow a new target when another target is locked by means of an interruption or the like |
| 6 | Stop Hold Continue | When the radar misses the preceding vehicle, the stop hold is continued and a brake is not cancelled |
| 7 | Automatic Cancellation | When the radar misses the preceding vehicle, the control is cancelled after some time interval |
| 8 | Alert | Notify the driver by means of visual and audio indications that a brake operation by the driver is required |

Figure 3:
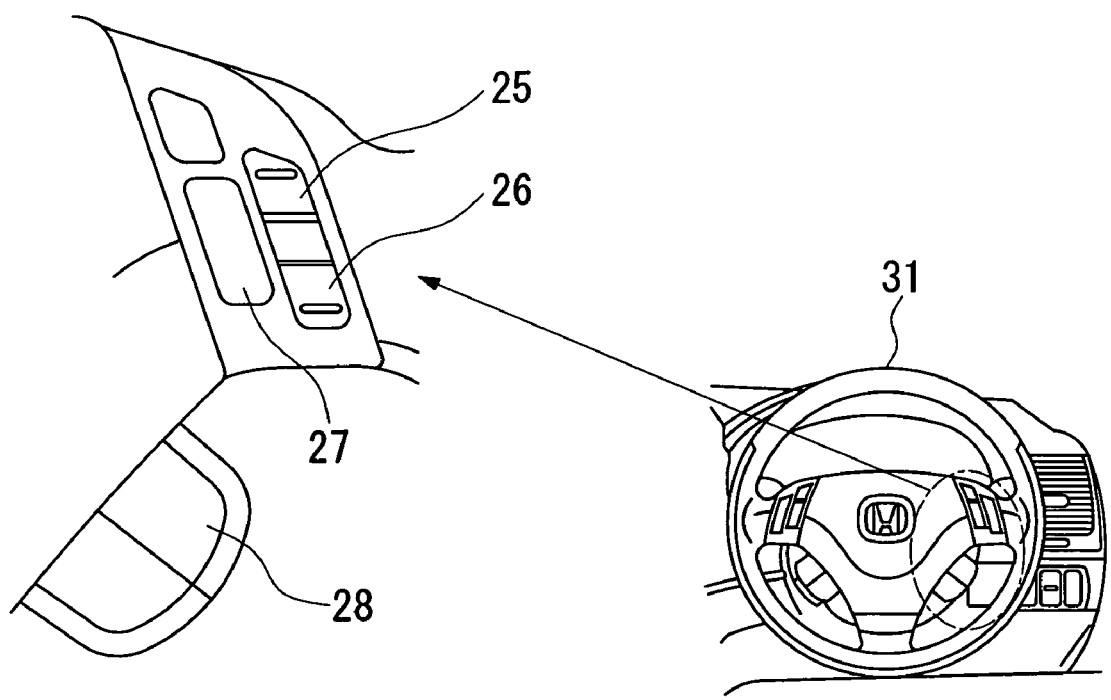
FIG. 3 illustrates an exemplary layout of a start/stop switch, a control start switch, a cancel switch, and an inter-vehicle distance set switch of the follow-up driving control apparatus shown in FIG. 1.

FIG. 3 illustrates an exemplary layout of the start/stop switch 25, the control start switch 26, the cancel switch 27, and the inter-vehicle distance set switch 28 described above. These switches are positioned near the steering wheel 31 for the convenience of the driver. The start/stop switch 25, the control start switch 26, the cancel switch 27, and the inter-vehicle distance set switch 28 may function as operating switches of a cruise control apparatus that is equipped in the vehicle 1.

Control State Transition

The state transition of driving control executed by the control state determination device 17 will be described with reference to the drawings.

Figure 4:
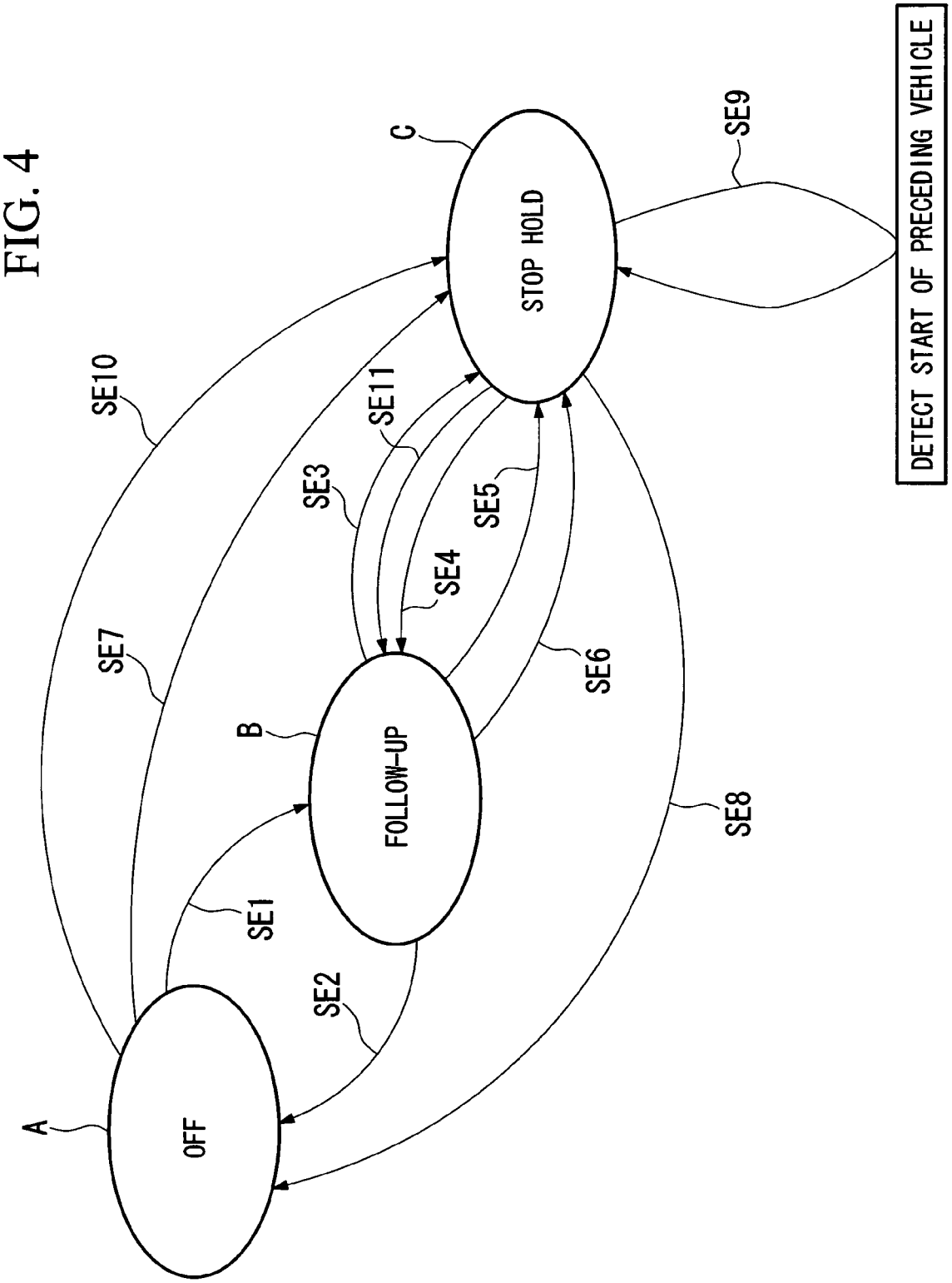
FIG. 4 is a state transition diagram of a driving control executed by a control state determination device in the follow-up driving control apparatus shown in FIG. 1.

FIG. 4 is a state transition diagram of driving control states in the control state determination device 17.

In FIG. 4, as described previously, the driving control states include three states: A: OFF, B: FOLLOW-UP, and C: STOP HOLD. Among them, in the A: OFF state, the driving control by the follow-up driving control apparatus is not executed. In the B: FOLLOW-UP state, the driving control by the follow-up driving control apparatus is executed. In the C: STOP HOLD state, after the preceding vehicle that the vehicle 1 follows stops, the vehicle 1 stops following the preceding vehicle, and remains stopped.

The control state determination device 17 causes a driving control state to be transitioned in response to various inputs described below, as shown in FIG. 4.

First, when the driving control state is in the A: OFF state, if the driver depresses the control start switch 26 while the preceding vehicle that the vehicle 1 follows is detected, the control state determination device 17 transitions the driving control state from the A: OFF state to the B: FOLLOW-UP state (state transition SE1).

In contrast, when the driving control state is in the B: FOLLOW-UP state, if the preceding vehicle that the vehicle 1 follows is missed or if the driver depresses the cancel switch 27 or presses the brake pedal, the control state determination device 17 transitions the driving control state from the B: FOLLOW-UP state to the A: OFF state (state transition SE2).

Furthermore, when the driving control state is in the B: FOLLOW-UP state, if the preceding vehicle is stopped and the vehicle 1 stops in a predetermined position behind the preceding vehicle, the control state determination device 17 transitions the driving control state from the B: FOLLOW-UP state to the C: STOP HOLD state (state transition SE3).

Furthermore, when the driving control state is in the C: STOP HOLD state, if the driver depresses the start/stop switch 25 or presses the accelerator pedal, the control state determination device 17 transitions the driving control state from the C: STOP HOLD state to the B: FOLLOW-UP state (state transition SE4). That is, a depression of the start/stop switch 25 when the state of the driving control is in the C: STOP HOLD state represents an intention of the driver to start the vehicle.

In contrast, if the driver depresses the start/stop switch 25 within a predetermined time after the driving control state transitions from the C: STOP HOLD state to the B: FOLLOW-UP state, the control state determination device 17 transitions the driving control state from the B: FOLLOW-UP state to the C: STOP HOLD state (state transition SE5). That is, a depression of the start/stop switch 25 in this case represents an intention of the driver to stop the vehicle.

Furthermore, if the preceding vehicle does not start within a predetermined time after the driving control state transitions from the C: STOP HOLD state to the B: FOLLOW-UP state, the control state determination device 17 transitions the driving control state from the B: FOLLOW-UP state to the C: STOP HOLD state (state transition SE6).

Furthermore, when the driving control state is in the A: OFF state, if the driver depresses the control start switch 26 when the preceding vehicle that the vehicle 1 follows is stopped and the vehicle 1 stops behind the preceding vehicle, the control state determination device 17 transitions the driving control state directly from the A: OFF state to the C: STOP HOLD state (state transition SE7).

When the driving control state is in the C: STOP HOLD state, if the driver depresses the cancel switch 27 or presses the brake pedal, the control state determination device 17 transitions the driving control state directly from the C: STOP HOLD state to the A: OFF state (state transition SE8).

If a start of the preceding vehicle is detected when the driving control state is in the C: STOP HOLD state, the control state determination device 17 notifies the driver of the start of the preceding vehicle by means of the notification processing device 12 (state transition SE9).

Furthermore, when the driving control state is in the A: OFF state, if the driver depresses the control start switch 26 when the vehicle 1 is stopped and when no preceding vehicle is detected by the radar apparatus 11, the control state determination device 17 transitions the driving control state directly from the A: OFF state to the C: STOP HOLD state (state transition SE10).

Furthermore, when the driving control state is in the C: STOP HOLD state, if a preceding vehicle is detected by the radar apparatus 11 within a predetermined time counted by a timer (e.g., 1 second) after the driver depresses the start/stop switch 26, the control state determination device 17 transitions the driving control state from the C: STOP HOLD state to the B: FOLLOW-UP state (state transition SE11).

FIG. 5 is a flowchart showing an operation to determine whether to start an LSF of the follow-up driving control. As shown in FIG. 5, after an LSF start determination processing is started in step S1, it is determined whether or not a start of an LSF is requested in step S2. This can be made by determining whether or not the driver depresses the control start switch 26. When the determination is evaluated as "YES" in step S2, the flow proceeds to step S3. Otherwise, if the decision made in step S2 is "NO", the processing of this flowchart is terminated and the process in S1 is repeated again.

In step S3, it is determined whether or not the vehicle speed of the vehicle 1 detected by the vehicle speed sensor 3 is equal to or less than a predetermined speed (for example, 40 km/h). When the determination is evaluated as "YES," the flow proceeds to step S4. Otherwise, if the decision made in step S3 is "NO", the processing of this flowchart is terminated and the process in S1 is repeated again. The reason this determination is made is that the LSF control is a control to be executed when the vehicle 1 is driving at a low speed. It should be noted that the above-described speed to be used in the determination may be changed to any speed with which a low speed can be determined.

In step S4, it is determined whether or not a preceding vehicle is detected by the radar apparatus 11. When this determination is evaluated as "YES," the flow proceeds to step S5. Otherwise, when the determination is evaluated as NO, the flow moves to step S6. In step S5, an LSF control is started. In this case, the driving state of the vehicle transitions to the B: FOLLOW-UP state in which the vehicle 1 is made to travel following the detected preceding vehicle. Alternatively, when the detected preceding vehicle is stopped, the state transitions to the C: STOP HOLD state. Then, the processing of this flowchart is terminated and the process in S1 is repeated again.

In step S6, it is determined whether or not the vehicle 1 is stopped based on the vehicle speed of the vehicle 1 detected by the vehicle speed sensor 3. When this determination is evaluated as "YES," the flow proceeds to step S7. Otherwise, if the decision made in step S5 is "NO", the processing of this flowchart is terminated and the process in S1 is repeated again. In step S7, an LSF control is started. In this case, the driving state of the vehicle is in the C: STOP HOLD state. Then, the processing of this flowchart is terminated and the process in S1 is repeated again.

The operation of the above-described flowchart is repeated at a predetermined interval (for example, 100 milliseconds). Accordingly, after the driving control state is set to the C: STOP HOLD state in step S7 because no preceding vehicle is detected, if a preceding vehicle is detected within a predetermined time counted by a timer (e.g., 1 second) in step S4 after the start/stop switch 26 is depressed by the driver in step S2, it is possible to transition the driving state of the vehicle to the B: FOLLOW-UP state in step S5.

As described previously, in the follow-up driving control apparatus according to this embodiment, even when no preceding vehicle is detected by the radar apparatus 11, a stop hold control is executed by the brake control device 14 or the like when the vehicle 1 is substantially stopped and when an intention of the driver to start the control using the control start switch 26 is detected. As a result, a stop hold control of the vehicle 1 can be executed even when no preceding vehicle is detected by the radar apparatus 11 within a small distance. Accordingly, it is possible to maintain the vehicle 1 in the stopped state even when the driver stops operating the brake pedal. Furthermore, the discomfort that the driver may feel when a follow-up control is cancelled even when the preceding vehicle is present in front of the vehicle 1 is eliminated.

Furthermore, when an intention by the driver to start the control by means of the control start switch 26 is detected after the preceding vehicle has started and the preceding vehicle can be detected by the radar apparatus 11, the follow-up control in which the vehicle is made to travel following the preceding vehicle is executed by the throttle control device 13 or the like. Thus, it is possible to smoothly switch a control mode to one in which the vehicle 1 is made to travel following the preceding vehicle thereby reducing the driver's load in carrying out driving operations. As described herein, the term "a vehicle is substantially stopped" means that the vehicle may be completely stopped, or the vehicle is traveling at a speed at which the vehicle can be regarded as being stopped (for example, at several kilometers per hour or less).

As described previously, according to the present invention, it is possible to start an LSF control even when no preceding vehicle is detected in front of the vehicle, thereby enhancing the convenience.

It should be noted that the present invention is not limited to the particular embodiment described above. For example, although the above embodiment is explained using a follow-up control apparatus having the radar apparatus 11 employing millimeter-waves, the radar apparatus may use a different wavelength.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving control apparatus comprising:
    a vehicle speed sensor that detects a traveling speed of a vehicle;
    an object detecting device that is installed in the vehicle and is capable of detecting objects that are present in a direction in which the vehicle travels;
    a preceding vehicle determining device that determines a preceding vehicle which the vehicle is to follow among the detected objects;
    a target inter-vehicle distance determination device that determines a target inter-vehicle distance between the vehicle and the preceding vehicle;
    a target vehicle speed determining device that determines a target vehicle speed of the vehicle based on a signal from the object detecting device and the target inter-vehicle distance determined;
    a driving control device that executes a driving control on the vehicle based on the determined target vehicle speed;
    a control state determination device that sets the control state of the vehicle to one of a follow-up control state in which the vehicle is made to travel following at least the preceding vehicle and a stop hold state in which the vehicle is maintained in a stopped state; and
    a control start intention detection device that detects an intention of a driver to start the follow-up control or the stop hold control,
    wherein the control state determination device sets the control state of the vehicle to the follow-up control state when the preceding vehicle is detected by the preceding vehicle determining device and when the intention of the driver to start the follow-up control or the stop hold control is detected by the control start intention detection device, and sets the control state of the vehicle to the stop hold state when the intention of the driver to start the follow-up control or the stop hold control is detected by the control start intention detection device while the vehicle is substantially in the stopped state and no object is detected by the object detection device.

2. The driving control apparatus according to claim 1, wherein the control start intention detection device detects the intention of the driver to start the follow-up control or the stop hold control based on a signal from a switch provided in the vicinity of a steering wheel.

3. The driving control apparatus according to claim 1, further comprising a time counting device that starts counting an elapsed time between when the intention of the driver to start the follow-up control or the stop hold control is detected and when the preceding vehicle is detected,
    wherein the control state determination device changes the control state of the vehicle from the stop hold state to the follow-up control state when the elapsed time that is counted by the time counting device is within a predetermined time period.

* * * * *